US008806232B2

(12) United States Patent
Millet et al.

(10) Patent No.: US 8,806,232 B2
(45) Date of Patent: Aug. 12, 2014

(54) SYSTEMS AND METHOD FOR HARDWARE DYNAMIC CACHE POWER MANAGEMENT VIA BRIDGE AND POWER MANAGER

(75) Inventors: Timothy J. Millet, Mountain View, CA (US); Erik P. Machnicki, San Jose, CA (US); Deniz Balkan, Santa Clara, CA (US); Vijay Gupta, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 372 days.

(21) Appl. No.: 12/894,516

(22) Filed: Sep. 30, 2010

(65) Prior Publication Data

US 2012/0084589 A1 Apr. 5, 2012

(51) Int. Cl.
*G06F 1/00* (2006.01)
*G06F 1/26* (2006.01)
*G06F 1/32* (2006.01)
*G06F 13/28* (2006.01)
*G06F 12/08* (2006.01)

(52) U.S. Cl.
CPC ...... *G06F 1/3203* (2013.01); *G06F 2212/1028* (2013.01); *G06F 1/3275* (2013.01); *Y02B 60/1282* (2013.01); *Y02B 60/1225* (2013.01); *G06F 12/0802* (2013.01); *G06F 1/3287* (2013.01); *Y02B 60/32* (2013.01)
USPC .............. 713/300; 713/320; 710/22; 710/267

(58) Field of Classification Search
CPC .............. G06F 1/00; G06F 1/32; G06F 13/28
USPC ............... 710/22, 267; 713/323, 300, 320
See application file for complete search history.

(56) References Cited

U.S. PATENT DOCUMENTS 5,530,932 A   6/1996  Carmean et al.
5,632,038 A   5/1997  Fuller
(Continued)

FOREIGN PATENT DOCUMENTS

EP      1653331      5/2006
JP      2002196846   7/2002
(Continued)

OTHER PUBLICATIONS

International Search Report Application No. 11182547.7-1243 / 2437138 Issued on Aug. 31, 2012.

(Continued)

*Primary Examiner* — Thomas Lee
*Assistant Examiner* — Terrell Johnson
(74) *Attorney, Agent, or Firm* — Lawrence J. Merkel; Meyertons, Hood, Kivlin, Kowert & Goetzel, P.C.

(57) ABSTRACT

In an embodiment, a control circuit is configured to transmit operations to a circuit block that is being powered up after being powered down, to reinitialize the circuit block for operation. The operations may be stored in a memory (e.g. a set of registers) to which the control circuit is coupled. In an embodiment, the control circuit may also be configured to transmit other operations from the memory to the circuit block prior to the circuit block being powered down. Accordingly, the circuit block may be powered up or powered down even during times that the processors in the system are powered down (and thus software is not executable at the time), without waking the processors for the power up/power down event. In an embodiment, the circuit block may be a cache coupled to the one or more processors.

11 Claims, 9 Drawing Sheets

(56) References Cited

U.S. PATENT DOCUMENTS

| | | | |
|---|---|---|---|
| 5,642,489 A | 6/1997 | Bland et al. | |
| 5,689,714 A | 11/1997 | Moyer | |
| 5,923,829 A * | 7/1999 | Ishii et al. | 714/6.32 |
| 6,041,401 A | 3/2000 | Ramsey et al. | |
| 6,052,789 A | 4/2000 | Lin | |
| 6,510,525 B1 | 1/2003 | Nookala et al. | |
| 6,826,704 B1 | 11/2004 | Pickett | |
| 7,779,191 B2 | 8/2010 | Lu et al. | |
| 7,848,718 B2 | 12/2010 | Koch et al. | |
| 7,869,835 B1 | 1/2011 | Zu | |
| 2002/0091978 A1 | 7/2002 | Higashida | |
| 2006/0020765 A1* | 1/2006 | Mahrla et al. | 711/170 |
| 2006/0174142 A1* | 8/2006 | Lin et al. | 713/300 |
| 2007/0113057 A1 | 5/2007 | Knoth | |
| 2007/0260794 A1* | 11/2007 | Ashish et al. | 710/267 |
| 2007/0288776 A1* | 12/2007 | DeMent et al. | 713/320 |
| 2008/0148083 A1* | 6/2008 | Pesavento et al. | 713/322 |
| 2009/0024799 A1 | 1/2009 | Jahagirdar et al. | |
| 2009/0235099 A1 | 9/2009 | Branover et al. | |
| 2010/0057950 A1* | 3/2010 | Barrow | 710/22 |
| 2010/0250974 A1 | 9/2010 | Ristic et al. | |

FOREIGN PATENT DOCUMENTS

| | | |
|---|---|---|
| JP | 2002305475 | 10/2002 |
| JP | 2002543486 | 12/2002 |
| JP | 2007536667 | 12/2007 |
| JP | 2010061644 | 3/2010 |
| JP | 2010529548 | 8/2010 |
| WO | 01/33322 | 5/2001 |

OTHER PUBLICATIONS

International Search Report Application No. NL 2007481 Issued on Sep. 5, 2012.

Lea Hwang Lee et al: "Instruction fetch energy reduction using loop caches for embedded applications with small tight loops", Proceedings 1999 International Symposium on Low Power Electronics and Design. (ISLPED). San Diego, CA, Aug. 16-17, 1999; [International Symposium on Low Power Electron ICS and Design], New York, NY : ACM, US, Aug. 16, 1999, pp. 267-269, XP010355969, DOI : 10.1145/313817.313944.

Combined Search and Exam Report in application No. GB1116886.1 issued Jan. 16, 2012.

International Search Report and Written Opinion in application No. PCT/US2011/052599 mailed Jan. 17, 2012 pp. 1-11.

Office Action from Korean Patent Application No. 10-2011-99679, mailed Feb. 12, 2013, (English Translation and Korean Versions), pp. 1-11.

Office Action from Japanese Patent Application No. 2011-230166, mailed Jan. 31, 2013 (English Translation and Japanese Versions), pp. 1-6.

* cited by examiner

SYSTEMS AND METHOD FOR HARDWARE DYNAMIC CACHE POWER MANAGEMENT VIA BRIDGE AND POWER MANAGER

BACKGROUND

1. Field of the Invention

This invention is related to the field of digital systems and, more particularly, to power management in digital systems.

2. Description of the Related Art

As the number of transistors included on an integrated circuit "chip" continues to increase, power management in the integrated circuits continues to increase in importance. Power management can be critical to integrated circuits that are included in mobile devices such as personal digital assistants (PDAs), cell phones, smart phones, laptop computers, net top computers, etc. These mobile devices often rely on battery power, and reducing power consumption in the integrated circuits can increase the life of the battery. Additionally, reducing power consumption can reduce the heat generated by the integrated circuit, which can reduce cooling requirements in the device that includes the integrated circuit (whether or not it is relying on battery power).

Clock gating is often used to reduce dynamic power consumption in an integrated circuit, disabling the clock to idle circuitry and thus preventing switching in the idle circuitry. Some integrated circuits have implemented power gating in addition to clock gating. With power gating, the power to ground path of the idle circuitry is interrupted, reducing the leakage current to near zero. When the power is gated to a block and later restored, the block can require reinitialization. The reinitialization is handled by software executed on a processor in the system.

SUMMARY

In an embodiment, a control circuit is configured to transmit operations to a circuit block that is being powered up after being powered down, to reinitialize the circuit block for operation. The operations may be stored in a memory (e.g. a set of registers) to which the control circuit is coupled, and software executing in the system that includes the control circuit and circuit block may program the memory with the operations at a time prior to the powering down of the circuit block. In an embodiment, the control circuit may also be configured to transmit other operations from the memory to the circuit block prior to the circuit block being powered down. Accordingly, the circuit block may be powered up or powered down even during times that the processors in the system are powered down (and thus software is not executable at the time), without waking the processors for the power up/power down event.

In an embodiment, the circuit block may be a cache coupled to the one or more processors, and the control circuit may be part of a bridge that couples one or more peripherals and/or peripheral interface controllers to the cache. The cache may be powered down if the processors are powered down and the peripherals are idle (at least with respect to accessing memory) for a period of time. The cache may be powered up for a peripheral memory operation or to power up the processors. In one embodiment, the cache control circuitry may be powered down, but the cache memory may remain powered to retain the cache blocks that are stored in the cache.

BRIEF DESCRIPTION OF THE DRAWINGS

The following detailed description makes reference to the accompanying drawings, which are now briefly described.

Figure 1:
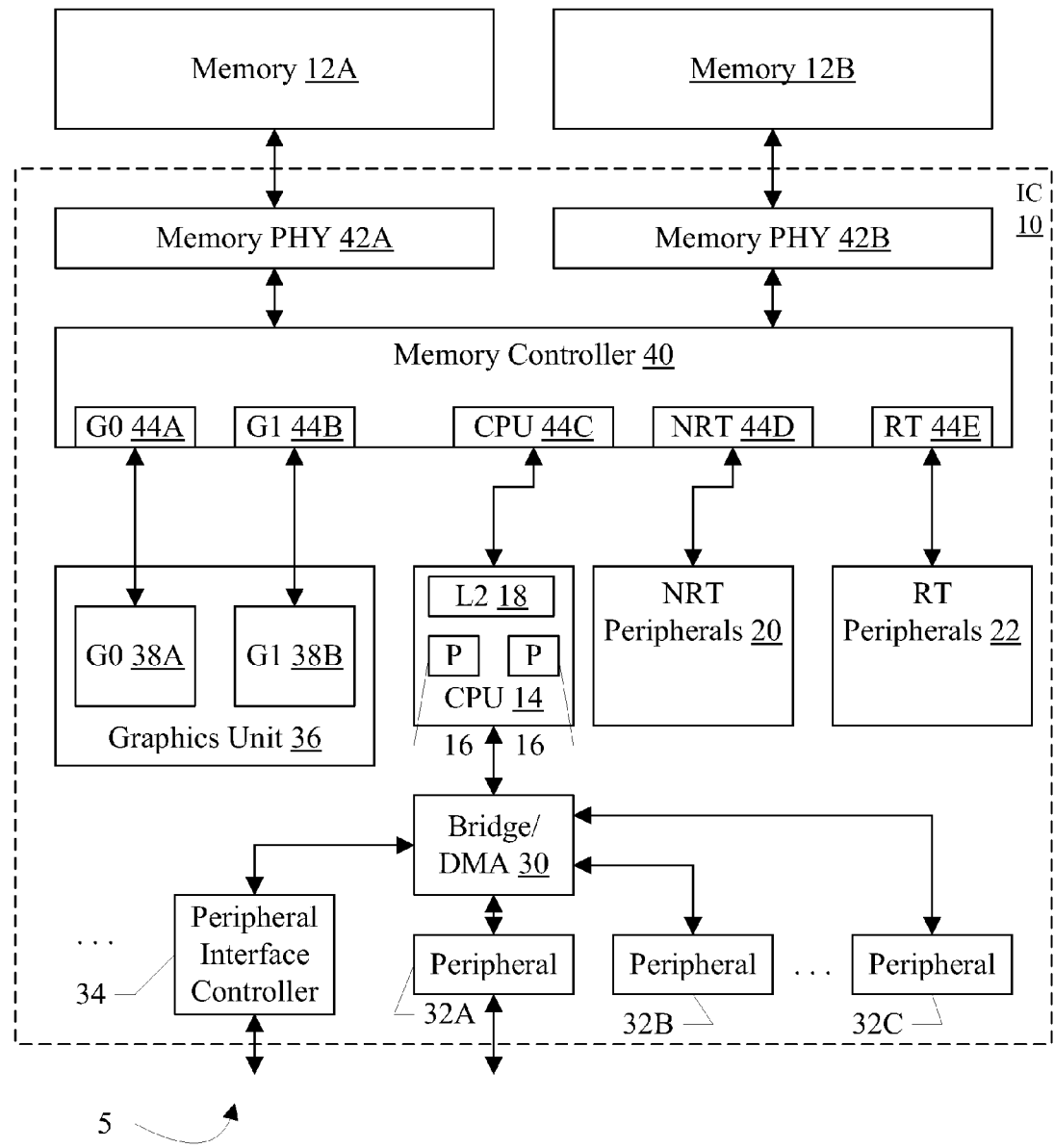
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

An exemplary system and integrated circuit are described below in which a level 2 (L2) cache may be powered up or down while the processors are powered down, and control circuitry in a bridge may be configured to perform operations to initialize the cache at power up and/or to prepare the cache for power down. However, other embodiments may implement a similar mechanism to power up/power down any circuit block during times that the processors in the system are powered down. The operations may be configuration register write operations, as discussed below for the L2 cache, or may be other types of operations such as register read operations or commands that are interpreted by the circuit block to change the circuit block's state for power up/power down.

Generally, a circuit block may include a set of related circuits that implement one or more identifiable functions. The related circuits may be referred to as logic circuits or logic circuitry, since the circuits may implement logic operations on inputs to generate outputs. Because the circuits in a given circuit block are related, they may be powered up or powered down as a unit. Each circuit block may generally be treated as a unit during the design of the integrated circuit (e.g. being physically placed within the integrated circuit as a unit). The circuit block may further include memory circuitry (e.g. various static random access memories, or SRAMs) and other storage devices that are part of the logic circuitry. For example, in an integrated circuit that implements a system on a chip (SOC), the components of the SOC may each be a separate circuit block.

Overview

Turning now to FIG. 1, a block diagram of one embodiment of a system 5 is shown. In the embodiment of FIG. 1, the system 5 includes an integrated circuit (IC) 10 coupled to external memories 12A-12B. In the illustrated embodiment, the integrated circuit 10 includes a central processor unit (CPU) block 14 which includes one or more processors 16 and a level 2 (L2) cache 18. Other embodiments may not include L2 cache 18 and/or may include additional levels of cache. Additionally, embodiments that include more than two processors 16 and that include only one processor 16 are contemplated. The integrated circuit 10 further includes a set of one or more non-real time (NRT) peripherals 20 and a set of one or more real time (RT) peripherals 22. In the illustrated embodiment, the CPU block 14 is coupled to a bridge/direct memory access (DMA) controller 30, which may be coupled to one or more peripheral devices 32A-32C and/or one or more peripheral interface controllers 34. The number of peripheral devices 32 and peripheral interface controllers 34 may vary from zero to any desired number in various embodiments. The system 5 illustrated in FIG. 1 further includes a graphics unit 36 comprising one or more graphics controllers such as G0 38A and G1 38B. The number of graphics controllers per graphics unit and the number of graphics units may vary in other embodiments. As illustrated in FIG. 1, the system 5 includes a memory controller 40 coupled to one or more memory physical interface circuits (PHYs) 42A-42B. The memory PHYs 42A-42B are configured to communicate on pins of the integrated circuit 10 to the memories 12A-12B. The memory controller 40 also includes a set of ports 44A-44E. The ports 44A-44B are coupled to the graphics controllers 38A-38B, respectively. The CPU block 14 is coupled to the port 44C. The NRT peripherals 20 and the RT peripherals 22 are coupled to the ports 44D-44E, respectively. The number of ports included in a memory controller 40 may be varied in other embodiments, as may the number of memory controllers. That is, there may be more or fewer ports than those shown in FIG. 1. The number of memory PHYs 42A-42B and corresponding memories 12A-12B may be one or more than two in other embodiments.

Generally, a port may be a communication point on the memory controller 40 to communicate with one or more sources. In some cases, the port may be dedicated to a source (e.g. the ports 44A-44B may be dedicated to the graphics controllers 38A-38B, respectively). In other cases, the port may be shared among multiple sources (e.g. the processors 16 may share the CPU port 44C, the NRT peripherals 20 may share the NRT port 44D, and the RT peripherals 22 may share the RT port 44E). Each port 44A-44E is coupled to an interface to communicate with its respective agent. The interface may be any type of communication medium (e.g. a bus, a point-to-point interconnect, etc.) and may implement any protocol. The interconnect between the memory controller and sources may also include any other desired interconnect such as meshes, network on a chip fabrics, shared buses, point-to-point interconnects, etc.

The processors 16 may implement any instruction set architecture, and may be configured to execute instructions defined in that instruction set architecture. The processors 16 may employ any microarchitecture, including scalar, superscalar, pipelined, superpipelined, out of order, in order, speculative, non-speculative, etc., or combinations thereof. The processors 16 may include circuitry, and optionally may implement microcoding techniques. The processors 16 may include one or more level 1 caches, and thus the cache 18 is an L2 cache. Other embodiments may include multiple levels of caches in the processors 16, and the cache 18 may be the next level down in the hierarchy. The cache 18 may employ any size and any configuration (set associative, direct mapped, etc.).

The graphics controllers 38A-38B may be any graphics processing circuitry. Generally, the graphics controllers 38A-38B may be configured to render objects to be displayed into a frame buffer. The graphics controllers 38A-38B may include graphics processors that may execute graphics software to perform a part or all of the graphics operation, and/or hardware acceleration of certain graphics operations. The amount of hardware acceleration and software implementation may vary from embodiment to embodiment.

The NRT peripherals 20 may include any non-real time peripherals that, for performance and/or bandwidth reasons, are provided independent access to the memory 12A-12B. That is, access by the NRT peripherals 20 is independent of the CPU block 14, and may proceed in parallel with CPU block memory operations. Other peripherals such as the peripherals 32A-32C and/or peripherals coupled to a peripheral interface controlled by the peripheral interface controller 34 may also be non-real time peripherals, but may not require independent access to memory. Various embodiments of the NRT peripherals 20 may include video encoders and decoders, scaler circuitry and image compression and/or decompression circuitry, etc.

The RT peripherals 22 may include any peripherals that have real time requirements for memory latency. For example, the RT peripherals may include an image processor and one or more display pipes. The display pipes may include circuitry to fetch one or more frames and to blend the frames to create a display image. The display pipes may further include one or more video pipelines. The result of the display pipes may be a stream of pixels to be displayed on the display screen. The pixel values may be transmitted to a display controller for display on the display screen. The image processor may receive camera data and process the data to an image to be stored in memory.

The bridge/DMA controller 30 may comprise circuitry to bridge the peripheral(s) 32 and the peripheral interface controller(s) 34 to the memory space. In the illustrated embodiment, the bridge/DMA controller 30 may bridge the memory operations from the peripherals/peripheral interface controllers through the CPU block 14 to the memory controller 40. The CPU block 14 may also maintain coherence between the bridged memory operations and memory operations from the processors 16/L2 Cache 18. The L2 cache 18 may also arbitrate the bridged memory operations with memory operations from the processors 16 to be transmitted on the CPU interface to the CPU port 44C. The bridge/DMA controller 30 may also provide DMA operation on behalf of the peripherals 32 and the peripheral interface controllers 34 to transfer blocks of data to and from memory. More particularly, the DMA controller may be configured to perform transfers to and from the memory 12A-12B through the memory controller 40 on behalf of the peripherals 32 and the peripheral interface controllers 34. The DMA controller may be programmable by the processors 16 to perform the DMA operations. For example, the DMA controller may be programmable via descriptors. The descriptors may be data structures stored in the memory 12A-12B that describe DMA transfers (e.g. source and destination addresses, size, etc.). Alternatively, the DMA controller may be programmable via registers in the DMA controller (not shown).

The peripherals 32A-32C may include any desired input/output devices or other hardware devices that are included on the integrated circuit 10. For example, the peripherals 32A-32C may include networking peripherals such as one or more networking media access controllers (MAC) such as an Ethernet MAC or a wireless fidelity (WiFi) controller. An audio unit including various audio processing devices may be included in the peripherals 32A-32C. One or more digital signal processors may be included in the peripherals 32A-32C. The peripherals 32A-32C may include any other desired functional such as timers, an on-chip secrets memory, an encryption engine, etc., or any combination thereof.

The peripheral interface controllers 34 may include any controllers for any type of peripheral interface. For example, the peripheral interface controllers may include various interface controllers such as a universal serial bus (USB) controller, a peripheral component interconnect express (PCIe) controller, a flash memory interface, general purpose input/output (I/O) pins, etc.

The memories 12A-12B may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMM5), etc. Alternatively, the devices may be mounted with the integrated circuit 10 in a chip-on-chip configuration, a package-on-package configuration, or a multi-chip module configuration.

The memory PHYs 42A-42B may handle the low-level physical interface to the memory 12A-12B. For example, the memory PHYs 42A-42B may be responsible for the timing of the signals, for proper clocking to synchronous DRAM memory, etc. In one embodiment, the memory PHYs 42A-42B may be configured to lock to a clock supplied within the integrated circuit 10 and may be configured to generate a clock used by the memory 12.

It is noted that other embodiments may include other combinations of components, including subsets or supersets of the components shown in FIG. 1 and/or other components. While one instance of a given component may be shown in FIG. 1, other embodiments may include one or more instances of the given component. Similarly, throughout this detailed description, one or more instances of a given component may be included even if only one is shown, and/or embodiments that include only one instance may be used even if multiple instances are shown.

L2 Cache Power Up/Power Down

Figure 2:
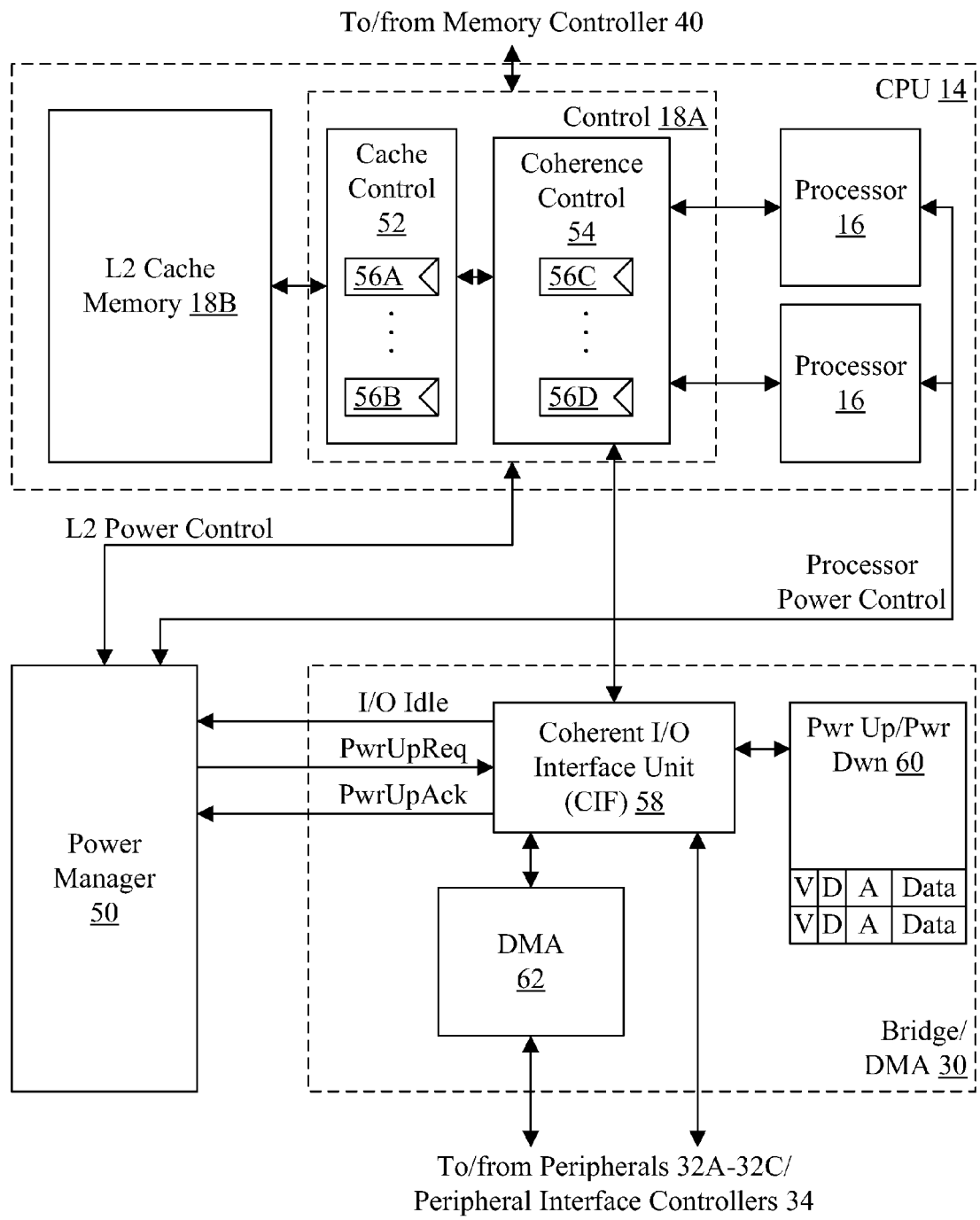
FIG. 2 is a block diagram of a portion of the system shown in FIG. 1, in greater detail for an embodiment.

Turning now to FIG. 2, a block diagram of one embodiment of a portion of the integrated circuit 10 is shown in greater detail. Particularly, the CPU block 14 and the bridge/DMA controller 30 are shown along with a power manager 50. The CPU block 14 includes the processors 16 and the L2 cache 18. In the embodiment of FIG. 2, the L2 cache 18 is illustrated as the L2 cache control 18A and the L2 cache memory 18B. The L2 cache control 18A may include a cache control circuit 52 and a coherence control circuit 54. Each of the cache control circuit 52 and the coherence control circuit 54 may include configuration registers such as configuration registers 56A-56D. The processors 16 are coupled to the L2 cache control 18A, and more particularly to the coherence control circuit 54. The coherence control circuit 54 may be coupled to the cache control circuit 52. The L2 cache control 18A, and more particularly the cache control circuit 52, may be coupled to the L2 cache memory 18B. The L2 cache control 18A may further be coupled the memory controller 40 (e.g. the CPU port 44C in FIG. 1). The power manager 50 may be coupled to the L2 cache control 18A (e.g. the L2 power control signals in FIG. 2) and the processors 16 (e.g. the processor power control signals in FIG. 2).

The bridge/DMA controller 30 may include a coherent I/O interface unit (CIF) 58, a power up/power down memory 60, and a DMA controller 62. The CIF 58 is coupled to the power up/power down memory 60, to the DMA controller 62, to the L2 cache control 18A (and more particularly to the coherence control circuit 54), to the power manager 50 (e.g. via the I/O idle, PwrUpReq, and PwrUpAck signals in FIG. 2), and to the peripherals 32A-32C and/or the peripheral interface controllers 34. The DMA controller 62 is further coupled to the peripherals 32A-32C and the peripheral interface controllers 34. In an embodiment, the DMA controller 62 and the CIF 58 may be coupled to respective subsets of the peripherals 32A-32C and/or the peripheral interface controllers 34. The subsets may overlap (e.g. some peripherals/peripheral interface controllers may be configured to communicate with memory both through DMA and through direct communications with the CIF 58). Other peripherals/peripheral interface controllers may communicate with memory only through DMA or only through operations directly transmitted to the CIF 58.

The configuration registers 56A-56D may be programmed by software to control various aspects of the operation of the cache control circuit 52 and the coherence control circuit 54. Generally, circuit blocks may implement configuration registers to permit software to select among various programmable configurations. For example, the size and configuration of the L2 cache 18 may be selectable within certain predefined maximums. The writethrough/writeback operation of the cache may be configured. The coherence mode may be enabled and controlled through configuration registers 56A-56D. In some embodiments, only the cache control circuit 52 may include cache configuration registers 56A-56D or only the coherence control circuit 54 may include cache configuration registers 56A-56D.

If the L2 cache 18 is powered down, the configuration data stored in at least some of the configuration registers 56A-56D is lost. To restore the configuration after a power down and subsequent power up of the L2 cache 18, the configuration data may be stored in the power up/power down memory 60. For example, when software programs a configuration register 56A-56D with a value that is also to be restored on power up, software may also write the value to the power up/power down memory 60. Similarly, there may be configuration register writes or other register writes to be performed prior to power down. For example, a register may be written with a synchronization command to synchronize the L2 cache 18 (ensuring that any outstanding memory operations or other communications are complete) prior to powering down.

The CIF 58 may be configured to read the operations from the power up/power down memory 60 during power up or power down events. The power manager 50 may be configured to signal a power up or power down event to the CIF 58, and the CIF 58 may be configured to read the memory 60 and transmit the operations for the corresponding event to the L2 cache 18. Once the operations are complete, the CIF 58 may be configured to communicate the completion to the power manager 50. In response, the power manager 50 may complete the power up/power down event.

Any communication may be implemented between the power manager 50 and the CIF 58. In the illustrated embodiment, the power manager 50 may signal a power up or power down event using the PwrUpReq signal. More specifically, the power manager 50 may be configured to assert the PwrUpReq signal to indicate that the L2 cache 18 is being powered up, and may be configured to deassert the PwrUpReq signal to indicate that the L2 cache 18 is being powered down. In response to the assertion of the PwrUpReq signal, the CIF 58 may be configured to read any operations in the power up/power down memory 60 that are indicated as power up operations, and may be configured to communicate the operations to the L2 cache 18. The CIF 58 may be configured to determine that the operations are complete (e.g. receiving write completions corresponding to each register write operation), and the CIF 58 may be configured to assert the PwrUpAck signal to acknowledge the power up event. The power manager 50 may be configured to re-enable communication to the L2 cache 18 responsive to the assertion of the PwrUpAck signal.

Powering down the L2 cache 18 may include at least powering down the cache control circuit 52. In some embodiments, the coherence control circuit 54 may also be powered down. The L2 cache memory 18B may remain powered on in some embodiments, retaining cache state in the cache (e.g. various cache blocks from the memory, state of the cache blocks such as tags, validity, and coherence state, etc.). Alternatively, the L2 cache memory 18B may also be powered down as part of powering down the L2 cache 18. Any circuitry/memory that was powered down may be powered up again in response to a power up event.

The power up/power down memory 60 may be formed from any semiconductor storage. For example, multiple registers may be provided that may be read/written by software. Other embodiments may use other forms of storage (e.g. random access memory (RAM) such as static RAM).

The power up/power down memory 60 may generally include multiple entries. Two exemplary entries are illustrated in the memory 60 in FIG. 2. In the illustrated embodiment, each entry in the power up/power down memory 60 may include an address and data pair, illustrated as the A field and the Data field in the entries of FIG. 2. The address may identify the configuration register to be written, and the data may be the value to be written to the configuration register. The address may be relative (e.g. the address may be an offset from a base address corresponding to the L2 cache control 18A, or base addresses for the coherence control circuit 54 and/or the cache control circuit 52, more specifically). Alternatively, the address may be the full address that would be transmitted by the processor 16 in a write operation to the corresponding register 56A-56D. Each entry may also include a valid bit (V) indicating whether or not the entry is storing valid information. Additionally, in this embodiment, each entry may include a power down (D) field which indicates whether the configuration register write is performed during power down or during power up. The D bit in the D field may be set to indicate a power down register write, and clear to indicate a power up register write. Other embodiments may use different memories for power down and power up, or may divide the memory in a known fashion, and the D field may not be included in each entry.

In an embodiment, software may be expected to write the power down address/data pairs in the initial entries of the power up/power down memory 60 and to write the power up address/data pairs in subsequent entries. In such an embodiment, in response to a power down event, the CIF 58 may read operations beginning with the initial entry until an entry having the D bit cleared is encountered. The CIF 58 may retain a pointer to the entry, and may begin reading power up operations from the indicated entry in response to a power up event (after which the pointer may be reset to point to the initial entry again).

While the power up/power down memory 60 may store configuration register writes, other embodiments may store any type of operations to be performed (e.g. register writes, register reads, commands, etc.). Accordingly, a flexible mechanism for powering up and powering down the L2 cache 18 may be supported. The mechanism may support powering the L2 cache 18 up or down while the processors 16 are powered down (and without waking the processors 16). Additionally, because the operations are programmable in the memory 60, the operations to be performed may be changed and the order of the operations may be changed. Accordingly, the mechanism may be corrected (if operating erroneously) via software changes even though the mechanism itself operates in hardware.

The cache control circuit 52 may generally be configured to manage access to the L2 cache memory 18B. The cache control circuit 52 may detect hit/miss for cache accesses, initiate cache fills for misses, manage the replacement policy in the L2 cache 18, etc. The coherence control circuit 54 may control cache coherence in the CPU block 14 for processor 16 memory operations and for memory operations from the CIF 58 (e.g. DMA operations from the DMA controller 62 and/or other memory operations received directly from the peripherals 32A-32C and/or the peripheral interface controllers 34). The coherence control 54 may maintain snoop tags for the caches in the processors 16, and may also be configured to generate cache accesses to the cache control circuit 52 to snoop the L2 cache memory 18B for cache coherence purposes.

The power manager 50 may be configured to monitor the processors 16 and the L2 cache 18, as well as various other activity in the integrated circuit 10 (not shown in FIG. 2). The power manager 50 may control the power state of the processors 16, including power the processors 16 up or down, via the processor power control signals. The processors 16 may be powered up and down independently or in synchronization in various embodiments.

The power manager 50 may be configured to power down the L2 cache 18 as well, if the L2 cache 18 is idle. The power manager 50 may detect that the L2 cache 18 is idle in a variety of fashions. For example, the power manager 50 may be aware that the processors 16 are powered down, and thus no memory operations may be expected from the processors 16. Additionally, the power manager 50 may detect that the bridge/DMA controller 30 is idle, at least with respect to memory operations. In the illustrated embodiment, the CIF 58 may generate an I/O idle signal. The CIF 58 may assert the I/O idle signal to indicate that there are no memory operations pending from the peripherals 32A-32C and/or the peripheral interface controllers 34, including no memory operations from the DMA controller 62. In an embodiment, the CIF 58 may detect that there are no memory operations for a programmable number of consecutive clock cycles before asserting the I/O idle signal to the power manager 50. In one embodiment, if the CIF 58 has asserted the I/O idle signal and subsequently receives a memory operation, the CIF 58 may be configured to deassert the I/O idle signal. However, the CIF 58 may await an indication from the power manager 50 that the memory operations can be transmitted. The indication may avoid a race condition in which the power manager 50 has started a power down event prior to the receipt of the memory operation, and thus may prevent the transmission of the memory operation to the L2 cache 18 where it could be lost as part of the power down event. In an embodiment, a ready signal (not shown) may be provided by the power manager 50 to indicate that the L2 cache 18 is ready for the memory operation after the assertion (and deassertion) of the I/O idle signal.

Turning next to FIGS. 3-6, flowcharts are shown illustrating operation of one embodiment of the power manager 50 and the CIF 58 for power up and power down events for the L2 cache 18. While the blocks are shown in a particular order for ease of understanding, other orders may be used. Blocks may be performed in parallel in combinatorial logic circuitry in the power manager 50 and/or the CIF 58. Blocks, combinations of blocks, and/or a flowchart as a whole may be pipelined over multiple clock cycles. The power manager 50 and/or the CIF 58 may be configured to implement the operation illustrated in the flowchart. More particularly, the power manager 50 and/or the CIF 58 may include hardware circuitry that implements the operation illustrated.

Figure 3:
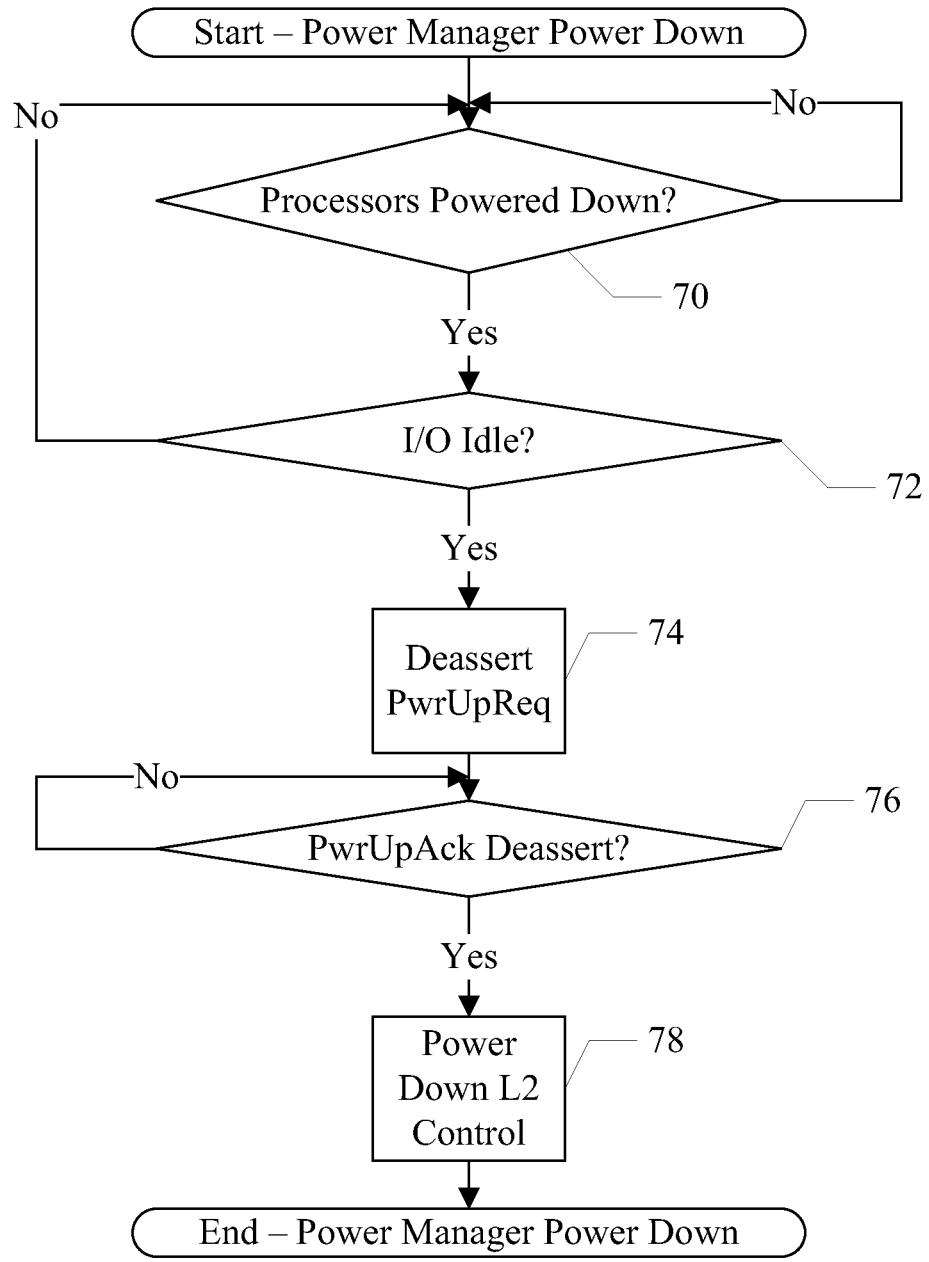
FIG. 3 is a flowchart illustrating operation of one embodiment of a power manager to power down a cache dynamically.

FIG. 3 is a flowchart illustrating operation of one embodiment of the power manager 50 for a power down event. The power manager 50 may determine that a power down event is to occur if the processors 16 are powered down (decision block 70, "yes" leg) and if the CIF 58 has signalled I/O idle (decision block 72, "yes" leg). If so, the power manager 50 may deassert the PwrUpReq signal to the CIF 58 (block 74), initiating the power down event. The power manager 50 may await the acknowledgement from the CIF 58 (decision block 76), and in response to a deassertion of the PwrUpAck (decision block 76, "yes" leg), the power manager 50 may power down the L2 cache (block 78).

Figure 4:
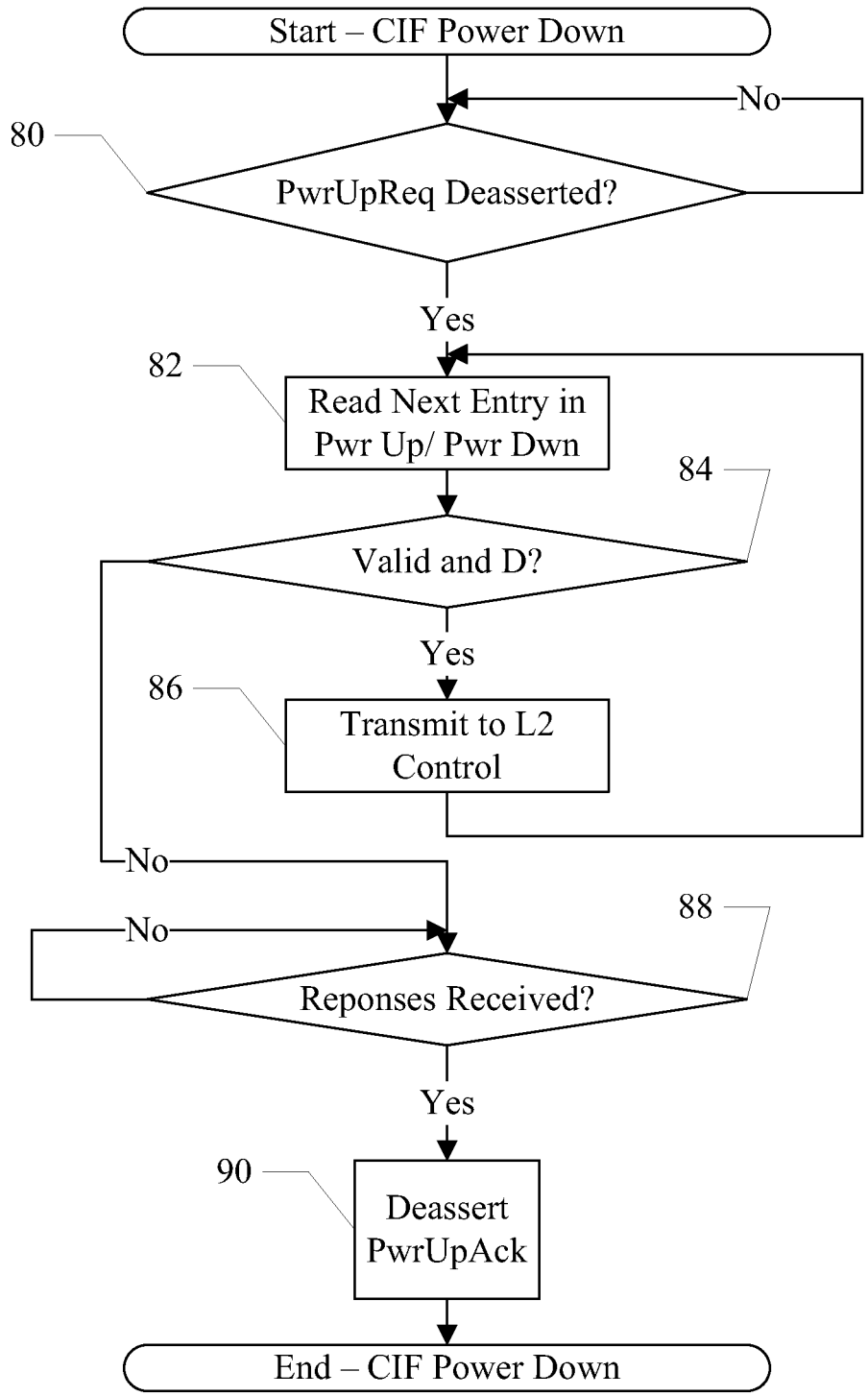
FIG. 4 is a flowchart illustrating operation of one embodiment of a core interface unit to power down a cache dynamically.

FIG. 4 is a flowchart illustrating operation of one embodiment of the CIF 58 for a power down event. CIF 58 processing of the power down event may begin in response to deassertion of the PwrUpReq signal from the power manager 50 (decision block 80, "yes" leg). The CIF 58 may read an initial entry from the power up/power down memory 60 (block 82), and may determine if the entry is valid and is for a power down event (V and D set, decision block 84). If so (decision block 84, "yes" leg), the CIF 58 may transmit the address/data pair to the L2 control 18A to update the identified configuration register 56A-56D (block 86) and may read the next entry in the memory 60 (block 82). If not (decision block 84, "no" leg), the CIF 58 may determine if the write responses for all of the configuration register writes have been received from the L2 control 18A (decision block 88). If the responses have been received (decision block 88, "yes" leg), the L2 control 18A may be prepared for power down and the CIF 58 may deassert the PwrUpAck signal to acknowledge the power down request (block 90).

Figure 5:
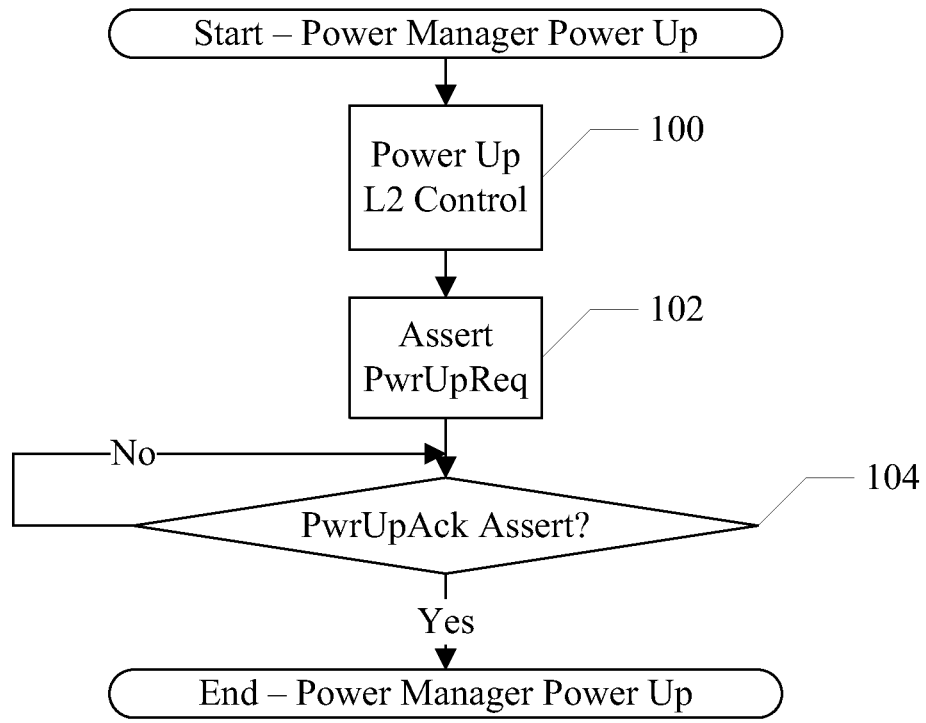
FIG. 5 is a flowchart illustrating operation of one embodiment of a power manager to power up a cache dynamically.

FIG. 5 is a flowchart illustrating operation of one embodiment of the power manager 50 for a power up event. The power manager 50 may determine that a power up event is to occur if the processors 16 are to be powered up, or if a memory operation is received in the CIF 58 (causing the I/O idle to deassert). The power manager 50 may power up the L2 cache control (block 100) and may wait for the power to stabilize. The power manager 50 may assert the PwrUpReq signal (block 102), and may wait for the PwrUpAck signal to be asserted (decision block 104) to determine that the L2 cache 18 is initialized and ready for communication again.

Figure 6:
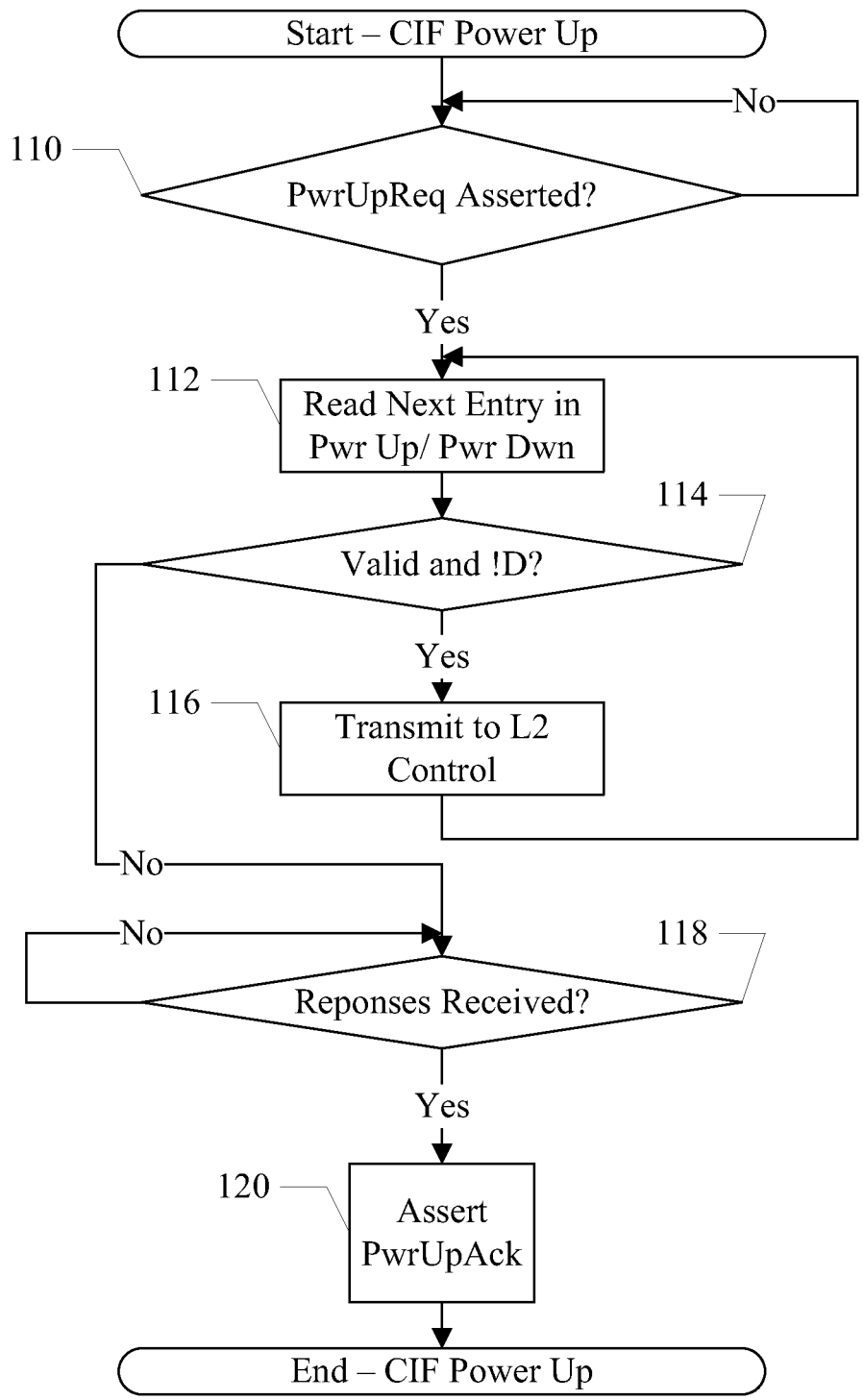
FIG. 6 is a flowchart illustrating operation of one embodiment of a core interface unit to power up a cache dynamically.

FIG. 6 is a flowchart illustrating operation of one embodiment of the CIF 58 for a power up event. CIF 58 processing of the power up event may begin in response to assertion of the PwrUpReq signal (decision block 110, "yes" leg). The CIF 58 may read the next entry in the power up/power down memory 60 (block 112). If the entry is valid and a power up operation (V set and D clear, decision block 114, "yes" leg), the CIF 58 may transmit the configuration register write to the L2 cache control 18A (block 116) and may read the next entry in the memory 60 (block 112). If the entry is not valid or is a power down operation (decision block 114, "no" leg), the CIF 58 may determine if the responses for the register writes have been received (decision block 118). If so (decision block 118, "yes" leg), the CIF 58 may assert the PwrUpAck signal (block 120).

In some embodiments, the power manager 50 may determine that the L2 cache 18 is to power down during the processing of the power up event, or may determine that the L2 cache 18 is to power up during the processing of the power down event. In some implementations, the power manager 50 may be configured to permit the in-progress transition to complete prior to initiating the new transition. In other implementations, the power manager 50 may be configured to signal the new transition upon determination (e.g. by changing the state of the PwrUpReq signal). The CIF 58 may be configured to monitor the PwrUpReq signal to detect the change of state, and may cease processing the in-progress event. The CIF 58 may either be configured to acknowledge the changed state without further processing, or may process the new event (performing the register writes for the new event).

Figure 7:
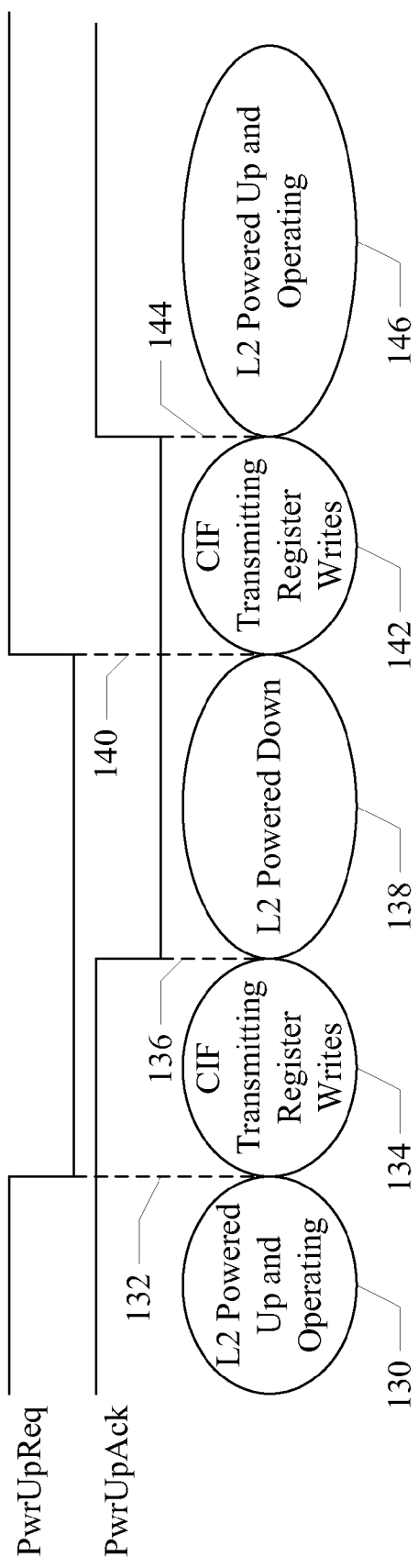
FIG. 7 is a timing diagram illustrating dynamic power down and power up of a cache.

FIG. 7 is a timing diagram illustrating a power down and power up sequence for the L2 cache 18, for one embodiment. Time may increase from left to right in FIG. 7, in arbitrary units. The L2 cache 18 may be powered up and operating at the beginning of the timing diagram (block 130), and the PwrUpReq and PwrUpAck signals are both asserted. The power manager 50 may determine that the L2 cache is to be powered down, and may deassert the PwrUpReq signal (dotted line 132). The CIF 58 may begin transmitting register writes and collecting responses (block 134). Once the writes are complete and the responses are received, the CIF 58 may deassert the PwrUpAck (dotted line 136) and the L2 cache 18 may be powered down (block 138). At a later point, the power manager 50 may determine that the L2 cache 18 is to be powered up, and may assert the PwrUpReq signal after establishing power to the L2 cache 18 (dotted line 140). The CIF 58 may transmit register writes to initialize the configuration registers (block 142), and may assert the PwrUpAck signal in response to completing the writes and receiving the responses (dotted line 144). The L2 cache 18 may be powered up and operating again at this point (block 146).

Figure 8:
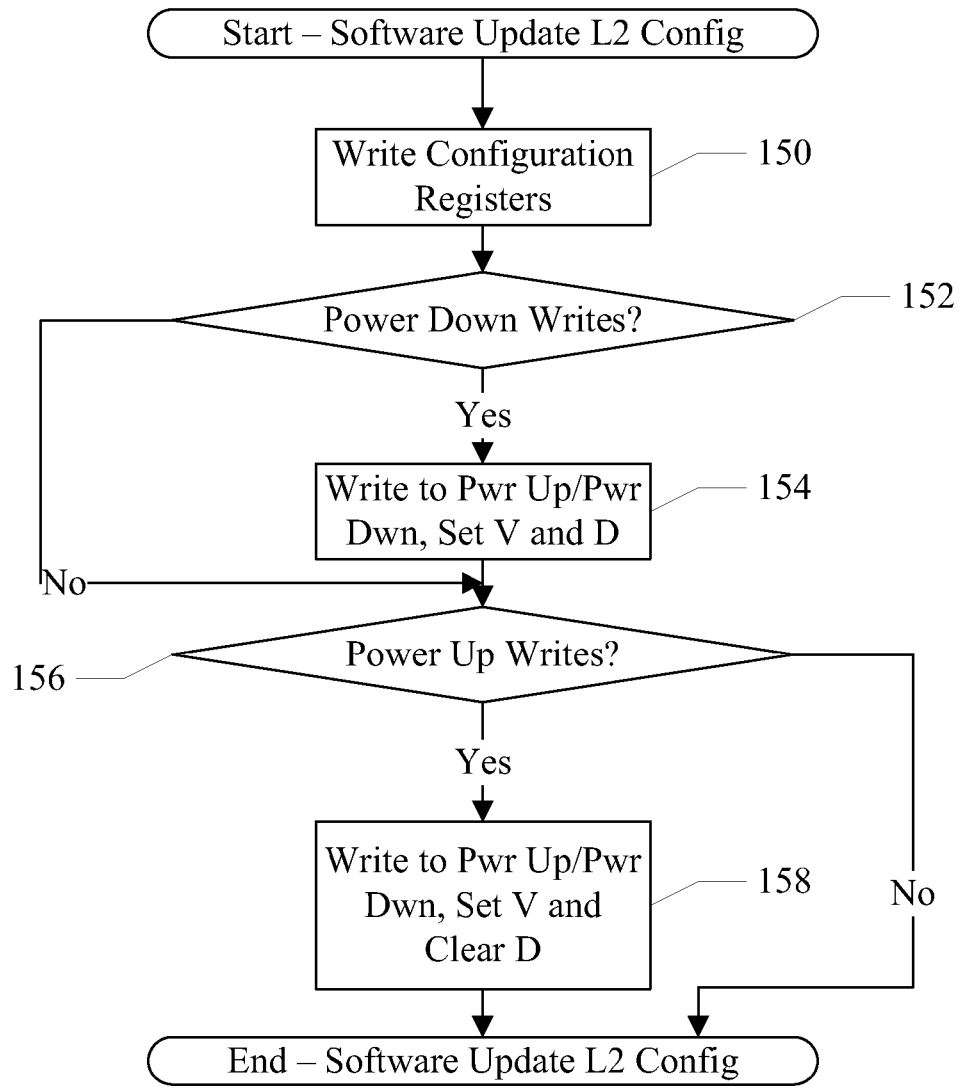
FIG. 8 is a flowchart illustrating operation of one embodiment of cache configuration code.

Turning now to FIG. 8, a flowchart is shown illustrating one embodiment of software that may update the L2 cache configuration. For example, the software may include L2 configuration code that may execute during boot of the system 5 and/or at other times during operation of the system that the L2 cache configuration is changed. The L2 configuration code may be executed on one of the processors 16 to implement the operation shown in FIG. 8. That is, the L2 configuration code may include instructions which, when executed by one of the processors 16, implements the operation shown in FIG. 8. While the blocks are shown in a particular order for ease of understanding, other orders may be used.

The L2 configuration code may write one or more configuration registers in the L2 cache 18 (block 150). If one or more of the configuration registers also need to be written during a power down of the L2 cache 18 (decision block 152, "yes" leg), the code may write the address of the configuration register and the corresponding data to the power up/power down memory 60 (block 154). For example, a register write that causes a synchronization of the L2 cache 18 may be included. The code may set the V and D bits in each entry written with a power down write. If one or more of the configuration registers are to be recovered during a power up of the L2 cache 18 (decision block 156, "yes" leg), the code may write the address of the configuration register and the corresponding data to the power up/power down memory 60 and may set the V bit and clear the D bit in each entry (block 158). It is noted that the same configuration register may be included in both the power down writes and the power up writes, in some embodiments.

In another embodiment, the CIF 58 may be configured to detect writes to configuration registers 56A-56D (or subsets of the configuration registers that are to be restored on power up events and/or written on power down events). The CIF 58 may automatically capture the values written to the registers in the power up/power down memory 60, and thus the L2 configuration code need not perform the writes to the memory 60 explicitly. In some such embodiments, the L2 configuration code may also be able to update the memory 60, in addition to the above-mentioned automatic capture. The L2 configuration code may insert the synchronization command for power down events, for example.

Figure 9:
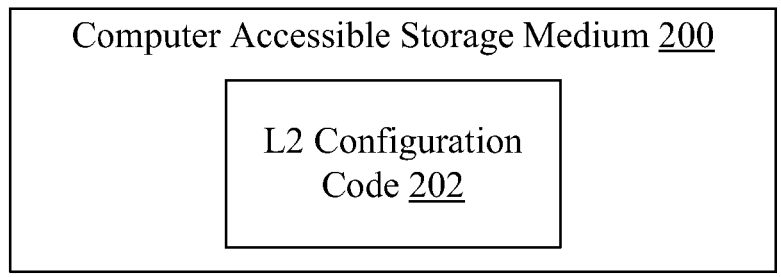
FIG. 9 is a block diagram of a computer accessible storage medium.

Turning next to FIG. 9, a block diagram of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link. The computer accessible storage medium 200 in FIG. 9 may store L2 configuration code 202, which may implement the flowchart of FIG. 8. Generally, the computer accessible storage medium 200 may store any set of instructions which, when executed, implement a portion or all of the flowchart shown in FIG. 8. A carrier medium may include computer accessible storage media as well as transmission media such as wired or wireless transmission.

Figure 10:
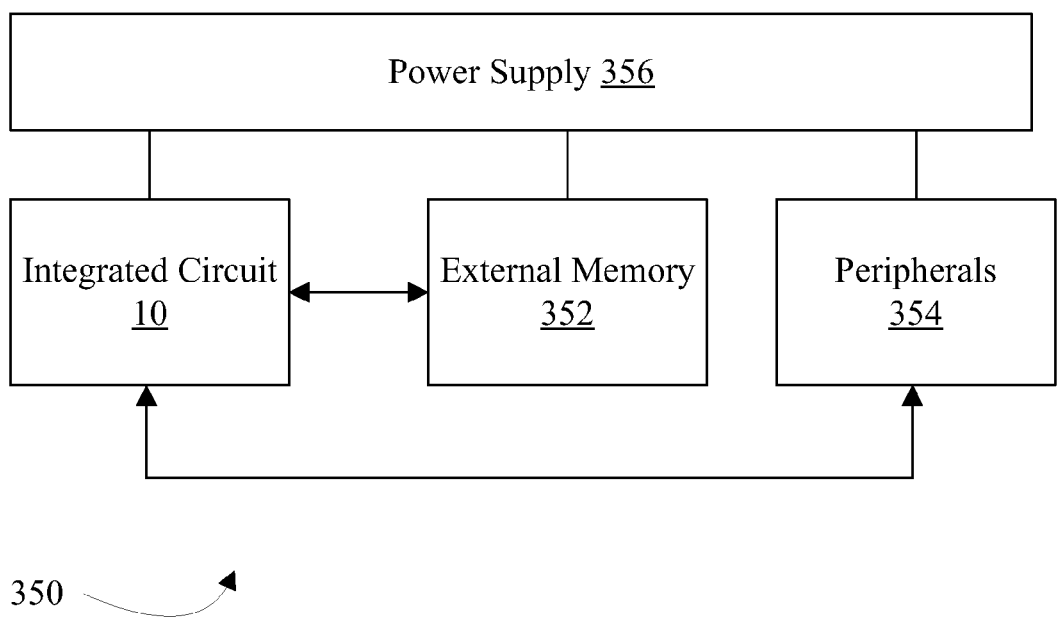
FIG. 10 is a block diagram of another embodiment of a system.

Turning now to FIG. 10, a block diagram of one embodiment of a system 350 is shown. In the illustrated embodiment, the system 350 includes at least one instance of an integrated circuit 10 coupled to an external memory 352. The external memory 352 may form the main memory subsystem discussed above with regard to FIG. 1 (e.g. the external memory 352 may include the memory 12A-12B). The integrated circuit 10 is coupled to one or more peripherals 354 and the external memory 352. A power supply 356 is also provided which supplies the supply voltages to the integrated circuit 358 as well as one or more supply voltages to the memory 352 and/or the peripherals 354. In some embodiments, more than one instance of the integrated circuit 10 may be included (and more than one external memory 352 may be included as well).

The memory 352 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMM5), etc. Alternatively, the devices may be mounted with an integrated circuit 10 in a chip-on-chip configuration, a package-on-package configuration, or a multi-chip module configuration.

The peripherals 354 may include any desired circuitry, depending on the type of system 350. For example, in one embodiment, the system 350 may be a mobile device (e.g. personal digital assistant (PDA), smart phone, etc.) and the peripherals 354 may include devices for various types of wireless communication, such as wifi, Bluetooth, cellular, global positioning system, etc. The peripherals 354 may also include additional storage, including RAM storage, solid state storage, or disk storage. The peripherals 354 may include user interface devices such as a display screen, including touch display screens or multitouch display screens, keyboard or other input devices, microphones, speakers, etc. In other embodiments, the system 350 may be any type of computing system (e.g. desktop personal computer, laptop, workstation, net top etc.).

Numerous variations and modifications will become apparent to those skilled in the art once the above disclosure is fully appreciated. It is intended that the following claims be interpreted to embrace all such variations and modifications.

What is claimed is:

1. A system comprising:
   one or more processors;
   a cache coupled to the one or more processors;
   a memory controller coupled to the cache;
   a bridge coupled to the cache via a separate connection than a connection of the memory controller to the cache, wherein the bridge is configured to couple to one or more peripherals via a second separate connection than the separate connection of the bridge to the cache, and wherein the bridge is configured to bridge memory operations issued by each of the one or more peripherals through the cache to the memory controller, and wherein the bridge is configured to bridge operations from the processors to the peripherals, wherein the peripherals comprise one or more hardware input/output (I/O) devices, and wherein the bridge comprises a plurality of registers that are programmable with data representing a first plurality of operations to be performed prior to powering down the cache and a second plurality of operations to be performed during a power up of the cache, and wherein the first plurality of operations to be performed prior to powering down the cache comprises at least one write operation to a register within the cache, wherein the at least one write operation causes the cache to perform a command, and wherein the bridge is configured to perform the first plurality of operations in response to a power down event for the cache and to perform the second plurality of operations in response to a power up event for the cache; and a power manager configured to generate the power down event responsive to detecting that the one or more processors are powered down and further responsive to detecting that there are no pending operations from the one or more peripherals to the memory controller.

2. The system as recited in claim 1 wherein the cache comprises a plurality of configuration registers, and wherein at least some of the second plurality of operations are writes to one or more of the plurality of configuration registers, and wherein the plurality of registers are programmed with addresses of the one or more of the plurality of configuration registers and the values to be written to the one or more of the plurality of configuration registers.

3. The system as recited in claim 1 wherein the bridge is configured to acknowledge the power down event responsive to completing the first plurality of operations.

4. The system as recited in claim 3 wherein the power manager is configured to generate the power up event, and wherein the bridge is configured to acknowledge the power up event responsive to completing the second plurality of operations.

5. The system as recited in claim 1 wherein the plurality of registers include an indication for each operation represented in the plurality of registers, the indication indicating whether the operation is one of the first plurality of operations or the second plurality of operations.

6. A method comprising:
   detecting that a cache is to be powered up in a system including one or more processors coupled to the cache, wherein the one or more processors are powered down at a time of the detecting;
   issuing a request to a bridge that is coupled to the cache and one or more peripherals, wherein the bridge is configured to bridge memory operations issued by each of the one or more peripherals through the cache to a memory controller, and wherein the bridge is configured to bridge operations from the processors to the peripherals, and wherein the peripherals comprise one or more hardware input/output (I/O) devices, and wherein the bridge is coupled to the cache via a separate connection than a connection of the memory controller to the cache, and wherein the bridge is configured to couple to one or more peripherals via a second separate connection than the separate connection of the bridge to the cache;
   the bridge responding to the request by performing a plurality of operations stored in the bridge to initialize one or more configuration registers in the cache;
   detecting that the cache is to be powered down in a power manager, wherein the detecting is responsive to detecting that the one or more processors are powered down and further responsive to detecting that there are no pending operations from the one or more peripherals to the memory controller;
   issuing a second request to the bridge indicating that the cache is to be powered down; and
   the bridge responding to the second request by performing one or more second operations stored in the bridge, wherein the one or more second operations include a first write operation to a first configuration register in the cache, wherein the first write operation causes the cache to perform a command.

7. The method as recited in claim 6 wherein each operation is represented by an address of the configuration register and a value to be written into the configuration register.

8. The method as recited in claim 6 wherein the one or more second operations cause a synchronization operation in the cache.

9. The method as recited in claim 6 further comprising:
   the bridge determining that the one or more second operations are complete;
   the bridge acknowledging the second request responsive to the determining; and
   powering down the cache responsive to the bridge acknowledging.

10. A system comprising:
    one or more processors;
    a cache coupled to the one or more processors, the cache comprising a plurality of configuration registers that are programmable to control operation of the cache;
    a memory controller coupled to the cache;
    a power manager coupled to the processors and the cache, wherein the power manager is configured to control power up and power down of the processors and the cache; and
    a bridge coupled to the cache via a separate connection than a connection of the memory controller to the cache, and wherein the bridge is coupled to the power manager, and wherein the bridge is configured to couple to one or more peripherals via a second separate connection than the separate connection of the bridge to the cache, and wherein the bridge is configured to bridge memory operations issued by each of the one or more peripherals through the cache to a memory controller, and wherein the bridge is configured to bridge operations from the processors to the peripherals, and wherein the peripherals comprise one or more hardware input/output (I/O) devices, and wherein the bridge comprises a plurality of registers programmable with address and data pairs representing register writes to the plurality of configuration registers, and wherein the bridge is configured to perform at least a first register write to a first configuration register of the plurality of configuration registers in response to a power down event for the cache signalled by the power manager, wherein the first register write causes the cache to perform a command, and wherein the bridge is configured to perform at least a second register write to a second configuration register of the plurality of configuration registers in response to a power up event for the cache, and wherein the power manager configured to generate the power down event responsive to detecting that the one or more processors are powered down and further responsive to detecting that there are no pending operations from the one or more peripherals to the memory controller.

11. The system as recited in claim 10 wherein the bridge is configured to determine that the first configuration register write is complete, and wherein the bridge is configured to signal the power manager in response to determining that the first configuration register write is complete, and wherein the power manager is configured to power down the cache responsive to the signal from the bridge.

* * * * *